(12) United States Patent
Verma

(10) Patent No.: US 10,693,841 B2
(45) Date of Patent: Jun. 23, 2020

(54) SYSTEM AND METHOD FOR TRANSMITTING DATA RELATING TO AN OBJECT

(71) Applicant: SIEMENS AKTIENGESELLSCHAFT, München (DE)

(72) Inventor: Amit Verma, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 235 days.

(21) Appl. No.: 15/278,749

(22) Filed: Sep. 28, 2016

(65) Prior Publication Data

US 2017/0093810 A1   Mar. 30, 2017

(30) Foreign Application Priority Data

Sep. 29, 2015  (EP) .................................... 15187286

(51) Int. Cl.
*H04L 29/06*   (2006.01)
*G06F 21/60*   (2013.01)

(52) U.S. Cl.
CPC ........ *H04L 63/0428* (2013.01); *G06F 21/602* (2013.01); *G06F 21/606* (2013.01)

(58) Field of Classification Search
None
See application file for complete search history.

(56) References Cited

U.S. PATENT DOCUMENTS

| | | | |
|---|---|---|---|
| 6,281,930 B1* | 8/2001 | Parker | H04N 5/232 250/206.2 |
| 2001/0027331 A1* | 10/2001 | Thompson | A61N 1/37282 607/60 |

(Continued)

FOREIGN PATENT DOCUMENTS

| | | |
|---|---|---|
| CN | 101257681 A | 9/2008 |
| WO | WO 2006015182 A2 | 2/2006 |

OTHER PUBLICATIONS

Rivest R. et al: "Cryptography and Machine Learning"; Correct System Design; [Lecture Notes in Computer Science; Lect.Notes Computer Springer International Publishing, Cham;Bd. Conf. 1; pp. 427-449; XP000473957; ISSN: 0302-9743; ISBN: 978-3-642-228773; 1991.

(Continued)

*Primary Examiner* — Joseph P Hirl
*Assistant Examiner* — Hassan Saadoun
(74) *Attorney, Agent, or Firm* — Henry M. Feiereisen LLC

(57) ABSTRACT

A system for the transmission of data relating to an object includes a local computing unit assigned to the object, said local computing unit including data memory, an evaluation unit and an application. The application causes the evaluation unit to store data relating to the object in the data memory. A software agent collects the data relating to the object stored in the data memory and transmits it to an external computing unit via a data connection. The software agent has a classification module that classifies the data relating to the object into sensitive data and non-sensitive data. The sensitive data is transmitted to the external computing unit using an encryption algorithm, and the non-sensitive data is transmitted to the external computing unit unencrypted.

12 Claims, 2 Drawing Sheets

(56) References Cited

U.S. PATENT DOCUMENTS

2012/0150773 A1\* 6/2012 DiCorpo .............. G06N 99/005
                                                                   706/12
2015/0200919 A1   7/2015 Czajkowski
2016/0227148 A1\* 8/2016 Griffith ................. G01N 25/72

OTHER PUBLICATIONS

Rene Hummen et al: "A Cloud design for user-controlled storage and processing of sensor data"; Cloud Computing Technology and Science (CLOUDCOM), 2012 IEEE 4TH International Conference ON, IEEE; pp. 232-240; XP032323255; DOI: 10.1109/CLOUDCOM. 2012.6427523; ISBN: 978-1-4673-4511-8; 2012.

\* cited by examiner

SYSTEM AND METHOD FOR TRANSMITTING DATA RELATING TO AN OBJECT

CROSS-REFERENCES TO RELATED APPLICATIONS

This application claims the priority of European Patent Application, Serial No. 15187286.8, filed Sep. 29, 2015, pursuant to 35 U.S.C. 119(a)-(d), the disclosure of which is incorporated herein by reference in its entirety as if fully set forth herein.

BACKGROUND OF THE INVENTION

The present invention relates to a method and a system for transmitting data relating to objects of a system operator.

The present invention belongs to the field of agent-based data collections for what are known as cloud-based systems and service. The invention additionally relates to the field of what is known as the "Internet of Things" (IoT) or "Web of Systems" (WoS). In agent-based data collections, agents represent the interface between a data source and a cloud-based system. They collect the data, perform any preliminary evaluations, and send the data to the system. Data can be sent directly, via proxies or via gateways. Automation units or computing units in an industrial environment, in particular in an automation system, are the data source. These units can be programmable logic controllers, field devices with controllers such as motors, converters, sensors, or also controllers in cars, light signals, cameras or the like. The agents can be pure software agents, which in this case are integrated directly in the aforementioned controllers or control systems, use their computing capacity and operate there as data collectors. Alternatively the agent can also run on dedicated hardware, which then connects the data source indirectly via communications protocols (Siemens S7, Profibus, Modbus, OPC DA/UA, SOAP/XML, etc.). With respect to the requirements when coupling the data source via agents, these can be subdivided into the types described below.

In one case, the agent collects data from the data source, sends it to the cloud-based system and/or can receive control signals from the cloud-based system to the data source. One example of a data collection and control agent of this kind could be an agent in a motor which, in a simple use case, reads data from sensors in the motor, for example acceleration data, and sends this data for analysis purposes to the cloud-based system. If a motor is involved, which is exposed for the industrial automation system because of its function and therefore has to be monitored, after evaluating the data the cloud-based system could detect an anomaly and send a stop command to the agent, which then in turn sends the motor controller a corresponding signal to stop the motor.

In another case, the agent is a passive data collector which simply collects data and sends it to the cloud-based system, which performs further analysis functions using this data. This type of agent does not receive any commands from the cloud-based system.

For security reasons, the communication between agents and a cloud-based external computer system is typically encrypted. The encryption uses secure communications protocols such as e.g. TLS, SSL, HTTPS. This leads to the following problems.

On the one hand, in most cases the agent software runs on hardware with a comparatively lower performance capability (known as Pico controllers or single-chip microcomputers, such as Arduino, Raspberry Pi, etc.). However, technologies for encrypting all the data traffic from the agent to the cloud-based computing unit are computationally intensive. This means that less computing power is available for other necessary activities such as data collection and data pre-processing. If the agent software runs on the field device's hardware, for example on a converter, and consequently uses the field device's resources, in many cases there is also insufficient computing power available as the performance capability of the field device's hardware has generally been matched to its primary functions and also therefore only has little reserve capacity left for these functions. Where agents are installed on battery-powered devices, the additional computing power of the agents leads to an even faster discharging of the batteries.

On the other hand, secure transmission channels between the agent and the cloud-based computing unit at the same transmission speed also demand comparatively higher bandwidths, since encryption protocols initiate secure network sessions which, because of what is known as overhead, significantly increase the total volume of data to be exchanged (e.g. because of certificates). The net effect becomes even worse if the secure communication session has to be repeatedly re-established many times, since establishing the communication is precisely what produces high overheads. Other IoT devices can have agents that use mobile communication channels (e.g. GSM, GPRS, EDGE, UMTS) for the exchange of data. In this case, costs may be dependent on the volume of data actually exchanged, which can make using secure communication channels for all data to be transmitted comparatively expensive and/or slow.

This problem is typically handled by using high-performance hardware and making the necessary bandwidths available. Although the problem of overheads for secure communication on small IoT devices has been acknowledged, it has not really been addressed.

It would therefore be desirable and advantageous to provide an improved system and method to obviate prior art shortcomings and to ensure the necessary security during data transmission with a reduced outlay of resources for encryption.

SUMMARY OF THE INVENTION

According to one aspect of the present invention, a system for transmitting data relating to an object includes a local computing unit assigned to the object, said local computing unit comprising data memory, an evaluation unit, and an application, with the application configured to cause the evaluation unit to store the data relating to the object in the data memory, and a software agent configured to collect the data relating to the object stored in the data memory and transmits it to an external computing unit via a data connection, said software agent including a classification module that classifies the data relating to the object into sensitive data and non-sensitive data, with the sensitive data being transmitted to the external computing unit using an encryption algorithm, and with the non-sensitive data being transmitted to the external computing unit unencrypted.

The system according to the invention is configured for the transmission of data relating to an object and includes a computing unit assigned to the object. In this context, the term object should be understood to mean field components that are connected via input/output interfaces in particular to an industrial process. The field components receive data from sensors and can exert a controlling effect generally by means of functional connections. However, an object can also be a device which itself includes sensor and/or control components and in this respect operates independently. A local computing unit is assigned to this object. The computing unit is generally integrated within the object and each object has a dedicated computing unit. In other cases, a computing unit can also be assigned to multiple objects. The local computing unit has data memory, an evaluation unit and an application, wherein the application causes the evaluation unit to store the data relating to the object in the data memory. Here the data relating to the object includes what is known as raw data from the object, for example sensor data from the process or from the sensor peripheral. However, the data relating to the object will also include data that can be acquired by the application from the sensor data, for example derived interim values or control commands.

The system further includes a software agent that collects the data relating to the object stored in the data memory and transmits it to an external computing unit via a data connection (in particular based on the Internet Protocol). The software agent has a classification module that classifies the data into sensitive and non-sensitive data. Data in the sensitive class is transmitted to the external computing unit using an encryption algorithm, and data in the non-sensitive class is transmitted to the external computing unit unencrypted. The subdivision into sensitive and non-sensitive data is based on rules, wherein a series of different rules can be defined and stored in the software agent as an instruction. For example, a monitoring case for the object of an industrial machine includes what is known as asset information, such as machine type, machine identification, machine location, network information (addresses) and/or machine configuration data etc. Of course, the monitoring case also includes monitoring data such as time series of temperature data or vibration data. In a case of this kind, the asset information could be classified as sensitive data, while the monitoring data is classified as non-sensitive data. An assignment of monitoring data to the object itself by third parties would then be precluded, thereby ensuring the necessary level of security in the transmission. In turn, data relating to production output (units produced per time unit) in a production facility could be sensitive data, while machine cycle times themselves can constitute non-sensitive data. In an even more general split, errors or warning messages could be sensitive data, while normal information is non-sensitive. Again, in other use cases, metadata could be sensitive data, while the rest of the data would constitute non-sensitive data. In vehicle monitoring, location data could constitute sensitive data, while the associated speed data is non-sensitive data. Or when monitoring objects in a home automation environment, data for identifying a sensor or type of sensor could be defined as sensitive data, unlike the temperatures or flow volumes measured by the sensor.

According to another advantageous feature of the present invention, the software agent can run as a further application on the local computing unit and the data relating to the object stored in the data memory can be accessed without further outlay of resources in respect of hardware. Communication interfaces of the local computing unit can be used.

According to another advantageous feature of the present invention, the classification module can further subdivide the data in the sensitive class, namely into classes of different encryption levels. This can produce for example one class that works with 256 bit encryption and another class that works with 128 bit encryption. In this way, data can be transmitted encrypted, with the level of encryption matching the data's content and sensitivity.

According to another advantageous feature of the present invention, the classification module can support machine learning technologies. The automatic classification can thus be based on machine learning technology of this kind. Using examples or training objects, the classification module learns in the evaluation whether sensitive or non-sensitive data is involved and, after completing a learning phase, can make generalizations in which certain patterns are extracted from the learning data, which can then be applied to future data and enable data to be classified. Learning technologies of this kind are known from other fields by names such as decision trees, support vector machines (SVM), or neural networks, etc. They can be implemented as supervised learning or unsupervised learning.

According to another aspect of the present invention, a method for transmitting data relating to an object to an external computing unit from a local computing unit assigned to the object includes collecting data relating to the object within the local computing unit by means of a software agent, transmitting the data relating to the object via a data connection to the external computing unit, dividing the data relating to the object by the software agent into sensitive data and non-sensitive data, transmitting the sensitive data encrypted to the external computing unit by the software agent, and transmitting the non-sensitive data unencrypted to the external computing unit by the software agent.

According to another advantageous feature of the present invention, the software agent further subdivides the sensitive data relating to the object and transmits the sensitive data with different encryption levels.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
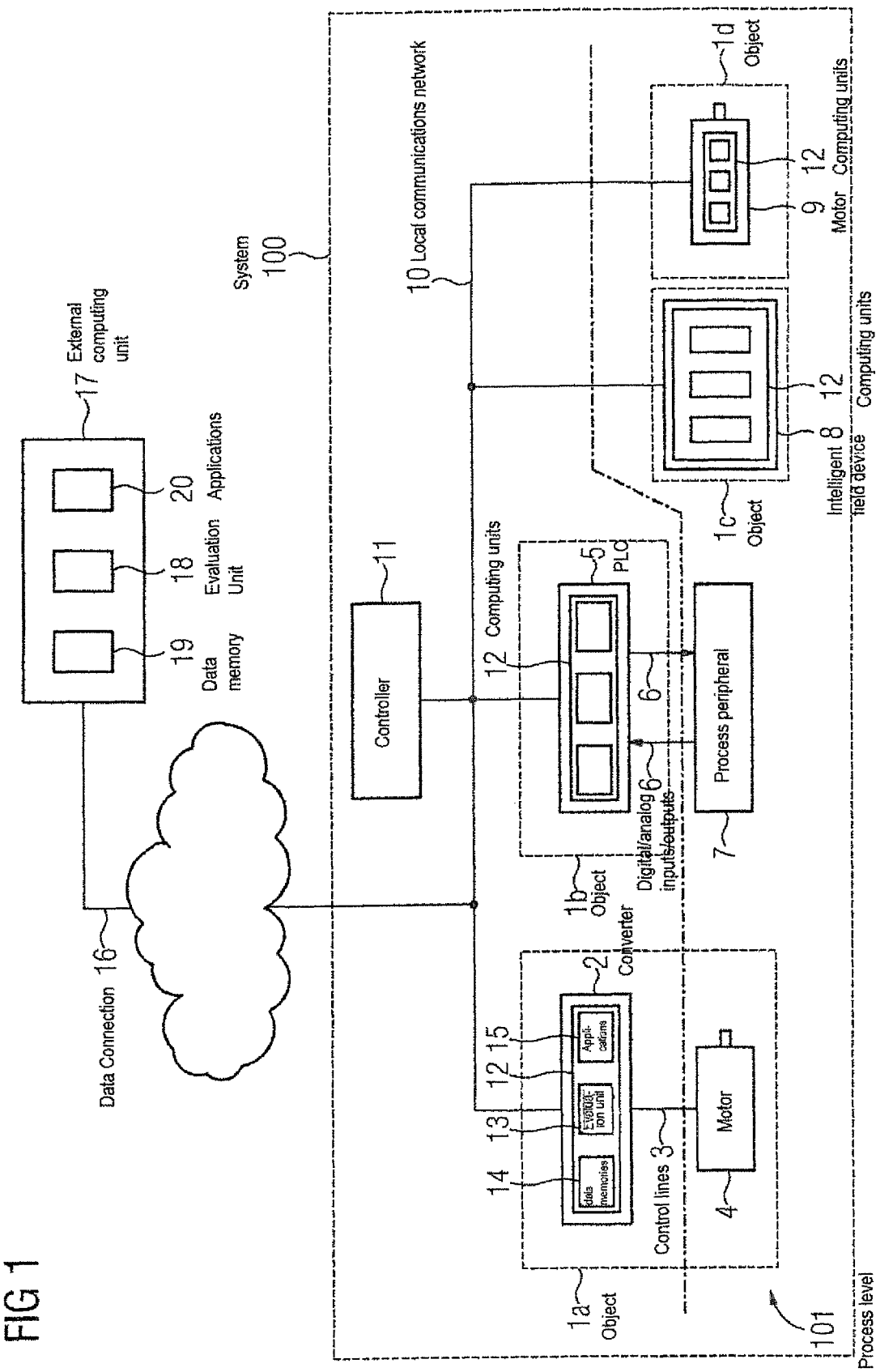
FIG. 1 shows a system consisting of multiple computing units for analyzing objects in a cloud-based computing unit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a system 100 for analyzing objects 1a to 1d. The objects are automation components in the control and field level, such as those known in factory automation for instance. Object 1a shows a motor 4 actuated by a converter 2 via the control lines 3. Object 1b shows a programmable logic controller 5 that is connected in the conventional manner via digital/analog inputs/outputs 6 to a process peripheral 7. In a further variant, object 1c shows an intelligent field device 8 and object 1d shows an intelligent, directly controlled motor 9. The objects are connected via a local communications network 10 and, in this example, to a controller 11 that performs higher-level control and monitoring functions. Objects 1a to 1d supply object data 22, which is both internal object data (generated, calculated within the object) as well as external object data (status data from the process level 101). Assigned to the objects are computing units 12 that process the object data, and/or monitor, control or regulate the objects. For this purpose the computing units 12 are equipped with an evaluation unit 13, data memories 14 and applications 15. Computing units 12 of the objects are connected via the data connection 16 to an external computing unit 17 and exchange data with it. The data connection 16 is preferably realized via the internet. Objects as shown in FIG. 1 belong to the same system operator, but different system operators can also be connected via the internet to the computing unit 17 and can send object data to it. The computing unit 17 has an evaluation unit 18 and data memory 19. Applications 20 handle the processing of object data with the aid of evaluation device 18 and data memories 19. The applications 20 can perform relatively complex control and regulation functions (for example in simulations), or carry out analytics, history analysis, condition monitoring, etc.

Figure 2:
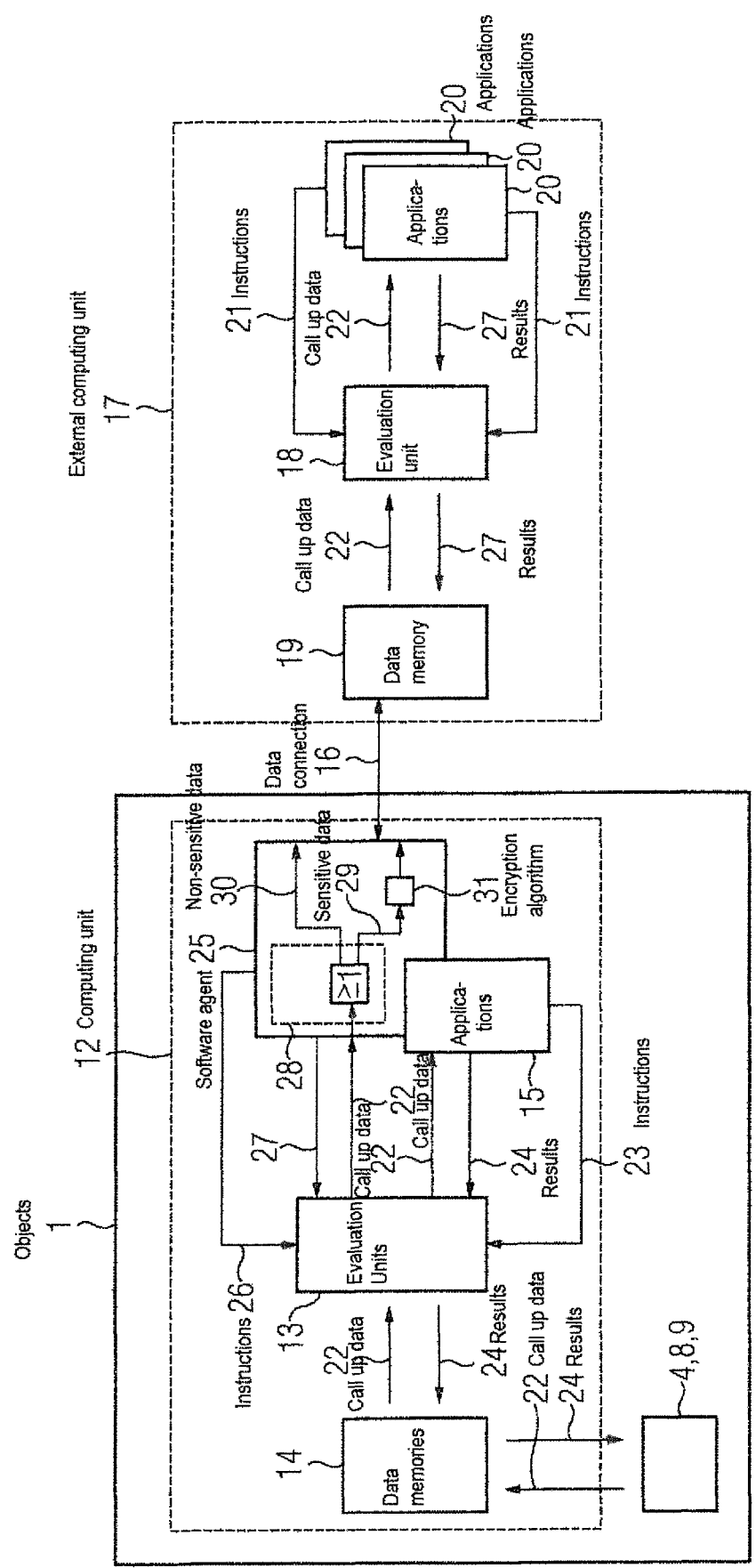
FIG. 2 shows the function of agents and classification module.

A software agent 25, the function of which is described in more detail in FIG. 2, is used as a data collector and collects and transmits the object data 22 to the computing unit 17.

FIG. 2 shows in schematic form the handling of data in the computing units 12 and 17. Here the object data 22 from the object 1 (1a, 1b, 1c or 1d) is received by the data memory 14 as a data source. This data can be any internal object data, such as currents or voltages of a connected motor or intermediate circuit voltages or currents of the converter that actuates the motor, target values calculated internally for the objects (therefore also results 24). However, this data can also be sensor data from external sensors or actuators relating to the object and/or the process controlled and/or monitored by the object. Depending on the embodiment, the object data can be transmitted to the data memory 14 continuously, periodically, or on a time-controlled or event-controlled basis. The data memory 14 interacts with the evaluation unit 13. The evaluation unit 13 has access to the data memory 14 and can request and/or call up data 22 from it. The evaluation unit 13 can be realized as a combination of hardware and software. In the variant described here, the evaluation unit is embodied separately from the data memories 14 as an independent computing unit. Requests from different applications 15 are processed through the evaluation unit 13. Here the applications 15 represent a program executed on the computing unit 12. An application 15 causes the evaluation unit 13 to process the data relating to the object 22 of the data memory 14 according to the instruction 23 stored in the application 15, and to transit the results 24 of this processing to the data memory 14 for transmission to the object 1. Object 1 can be controlled and/or influenced by means of these results. By means of instructions 26, a software agent 25 of a service operator, which in accordance with FIG. 2 runs as an executable application within the computing unit 2, causes the evaluation unit 13 to pass the data relating to the object 22, 24 of the data memory 14 via the data connection 16 to the external computing unit 17. The computing unit 17 has data memories 19, an evaluation unit 18 and applications 20. The computing unit 17 can include applications of different service operators. The application 20 instructs the evaluation unit 18 to process data 22 of the data memory 19 according to the instruction 21 stored in the application 20, and to store the results 27 in the data memory 19. Data from the data memory 19 can reach the computing unit 12 via the agent 25 and the data connection 16. Agent 25 has a classification module 28 that divides a classification of the data relating to the object 22, 24 into sensitive data 29 and non-sensitive data 30. The sensitive data 29 is passed through an encryption algorithm 31 before data transmission via the data connection 16 and is transmitted encrypted, while the non-sensitive data 30 is transmitted unencrypted via the data connection 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A system for transmitting data relating to a plurality of objects, comprising:
   a local computing unit assigned to and integrated within each of the plurality of objects connected via a local communications network so that each of the plurality of objects has a dedicated computing unit, said local computing unit comprising data memory, an evaluation unit, and multiple applications, wherein requests from the applications are processed through the evaluation unit, and wherein each of the applications causes the evaluation unit to process the data relating to each of the plurality of objects of the data memory according to an instruction stored in each of the applications with the applications configured to cause the evaluation unit to store the data relating to each of the plurality of objects in the data memory; and
   a software agent configured to collect the data relating to each of the plurality of objects stored in the data memory and transmits it to an external computing unit via a data connection, said software agent including a classification module, wherein the classification module is configured to classify the data into classes of different encryption levels according to a sensitivity of the data, thereby transmitting the sensitive data to the external computing unit in encrypted form, wherein each of the plurality of objects is an automation component in a control level or field level and the object supplies both internal and external object data, wherein the internal object data is calculated within each of the plurality of objects and the external object data is status data from a process level.

2. The system of claim 1, wherein the software agent runs as a further application on the local computing unit.

3. The system of claim 1, wherein the software agent runs on dedicated hardware connected for communication purposes with the local computing unit in the local communications network.

4. The system of claim 1, wherein the classification module is configured to subdivide the sensitive data into classes of different encryption levels.

5. The system of claim 1, wherein the classification module is configured to support machine learning technologies.

6. The system of claim 1, wherein the classification module is configured to support machine learning technologies that have a decision tree, a support vector machine, or a neural network.

7. A method for transmitting data relating to a plurality of objects connected via a local communications network to an external computing unit from a local computing unit assigned to each of the plurality of objects, comprising:
providing the local computing unit assigned to each of the plurality of objects with a data memory, an evaluation unit, and multiple applications;
processing requests from the applications through the evaluation unit, wherein each of the applications causes the evaluation unit to process the data relating to each of the plurality of objects of the data memory according to an instruction stored in each of the applications with the applications configured to cause the evaluation unit to store the data relating to each of the plurality of objects in the data memory;
collecting data relating to each of the plurality of objects within the local computing unit by means of a software agent including a classification module;
transmitting the data relating to each of the plurality of objects via a data connection to the external computing unit;
dividing the data relating to the object by the software agent into classes of different encryption levels according to a sensitivity of the data including sensitive data and non-sensitive data using the classification module;
transmitting the sensitive data encrypted to the external computing unit by the software agent; and
transmitting the non-sensitive data unencrypted to the external computing unit by the software agent,
wherein each of the plurality of objects is an automation component in a control level or field level and each of the plurality of objects supplies both internal and external object data, wherein the internal object data is calculated within each of the plurality of objects and the external object data is status data from a process level.

8. The method of claim 7, further comprising subdividing the sensitive data into subclasses and transmitting the sensitive data of these subclasses with different encryption levels.

9. The method of claim 7, wherein the dividing step is based on machine learning technologies.

10. The method of claim 1, wherein each of the plurality of objects is a converter.

11. A system for transmitting data relating to a plurality of objects, comprising:
a local computing unit assigned to multiple objects of the plurality of objects connected via a local communications network, said local computing unit comprising data memory, an evaluation unit, and multiple applications, wherein requests from the applications are processed through the evaluation unit, and wherein each of the applications causes the evaluation unit to process the data relating to the multiple objects of the plurality of objects of the data memory according to an instruction stored in each of the applications with the applications configured to cause the evaluation unit to store the data relating to the multiple objects of the plurality of objects in the data memory; and
a software agent configured to collect the data relating to the multiple objects of the plurality of objects stored in the data memory and transmits it to an external computing unit via a data connection, said software agent including a classification module, wherein the classification module is configured to classify the data into classes of different encryption levels according to a sensitivity of the data, thereby transmitting the sensitive data to the external computing unit in encrypted form, wherein the multiple objects of the plurality of objects are automation components in a control level or field level and the plurality of objects supply both internal and external object data, wherein the internal object data is calculated within the multiple objects of the plurality of objects and the external object data is status data from a process level.

12. A method for transmitting data relating to a plurality of objects connected via a local communications network to an external computing unit from a local computing unit assigned to multiple objects in the plurality of objects, comprising:
providing the local computing unit assigned to the multiple objects in the plurality of objects with a data memory, an evaluation unit, and multiple applications;
processing requests from the applications through the evaluation unit, wherein each of the applications causes the evaluation unit to process the data relating to the multiple objects of the data memory according to an instruction stored in each of the applications with the applications configured to cause the evaluation unit to store the data relating to the multiple objects in the data memory;
collecting data relating to the multiple objects within the local computing unit by means of a software agent including a classification module;
transmitting the data relating to the multiple objects via a data connection to the external computing unit;
dividing the data relating to the multiple objects by the software agent into classes of different encryption levels according to a sensitivity of the data including sensitive data and non-sensitive data using the classification module;
transmitting the sensitive data encrypted to the external computing unit by the software agent; and
transmitting the non-sensitive data unencrypted to the external computing unit by the software agent,
wherein the multiple objects are automation components in a control level or field level and the multiple objects supply both internal and external object data, wherein the internal object data is calculated within the object and the external object data is status data from a process level.

* * * * *